No. 829,076. PATENTED AUG. 21, 1906.
J. W. LATIMER.
HAY RACK.
APPLICATION FILED JAN. 13, 1906.
4 SHEETS—SHEET 2
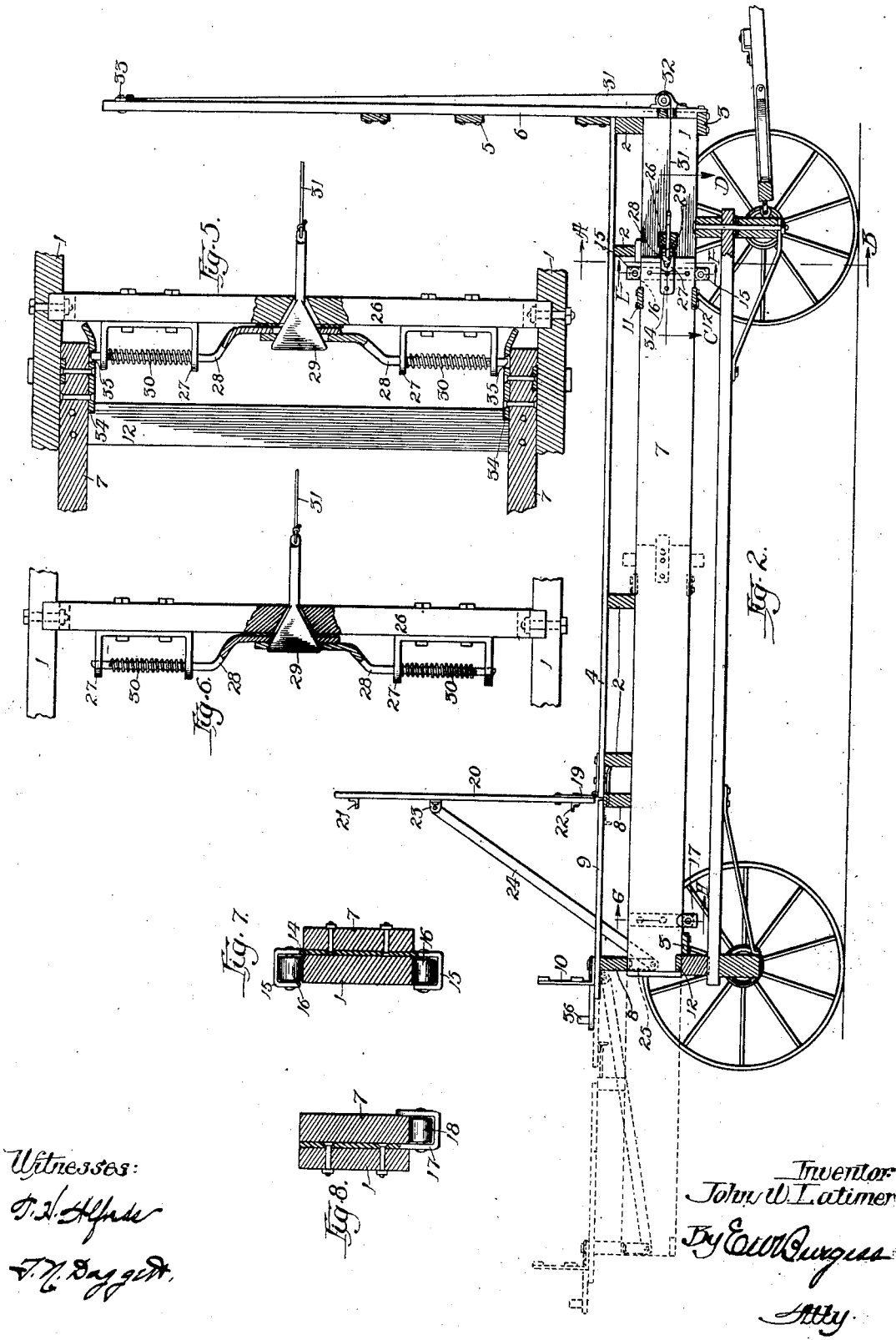
Witnesses:
Inventor:
John W. Latimer
By E. W. Burgess
Atty.

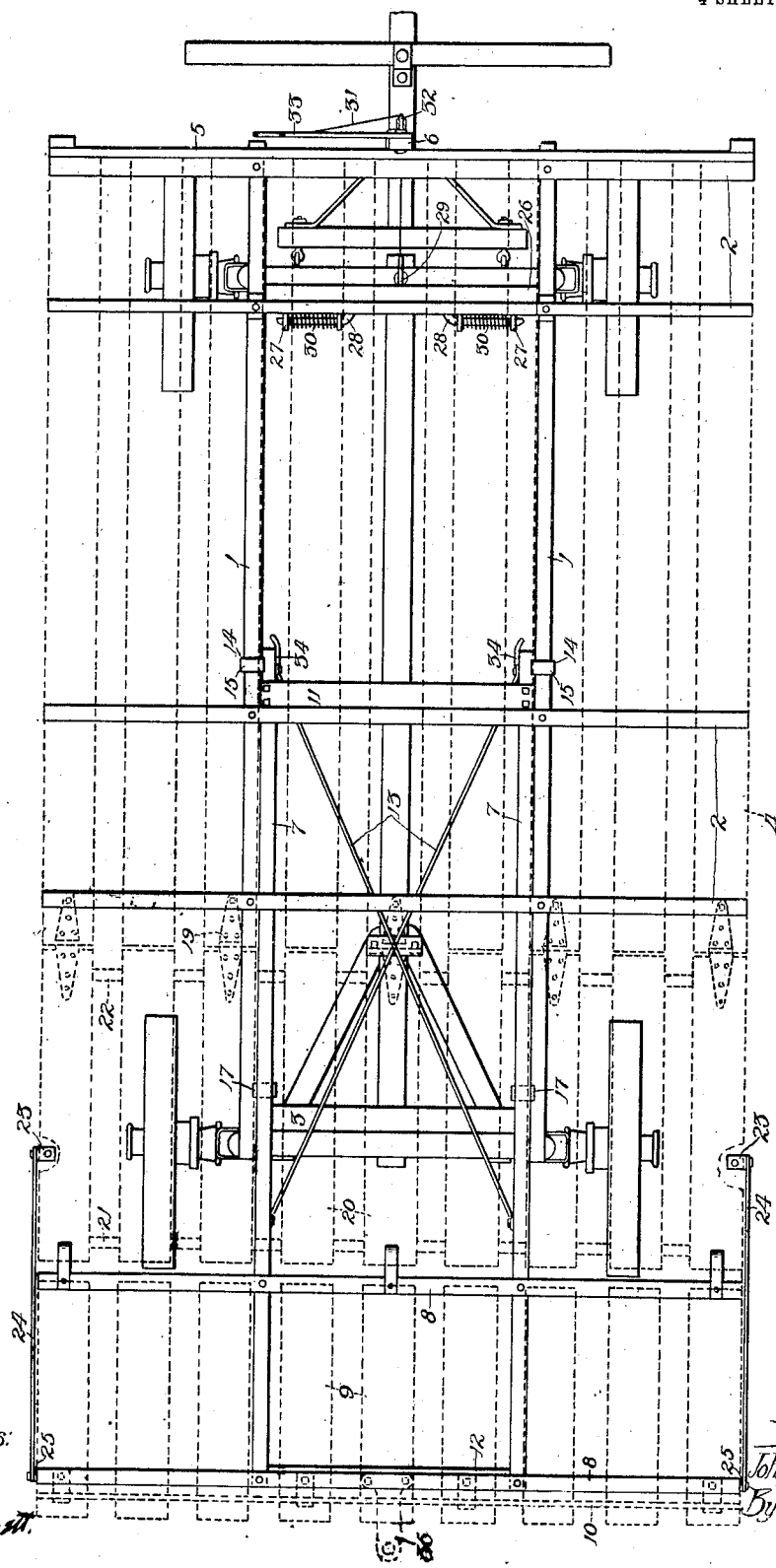

No. 829,076. PATENTED AUG. 21, 1906.
J. W. LATIMER.
HAY RACK.
APPLICATION FILED JAN. 13, 1906.
4 SHEETS—SHEET 3.
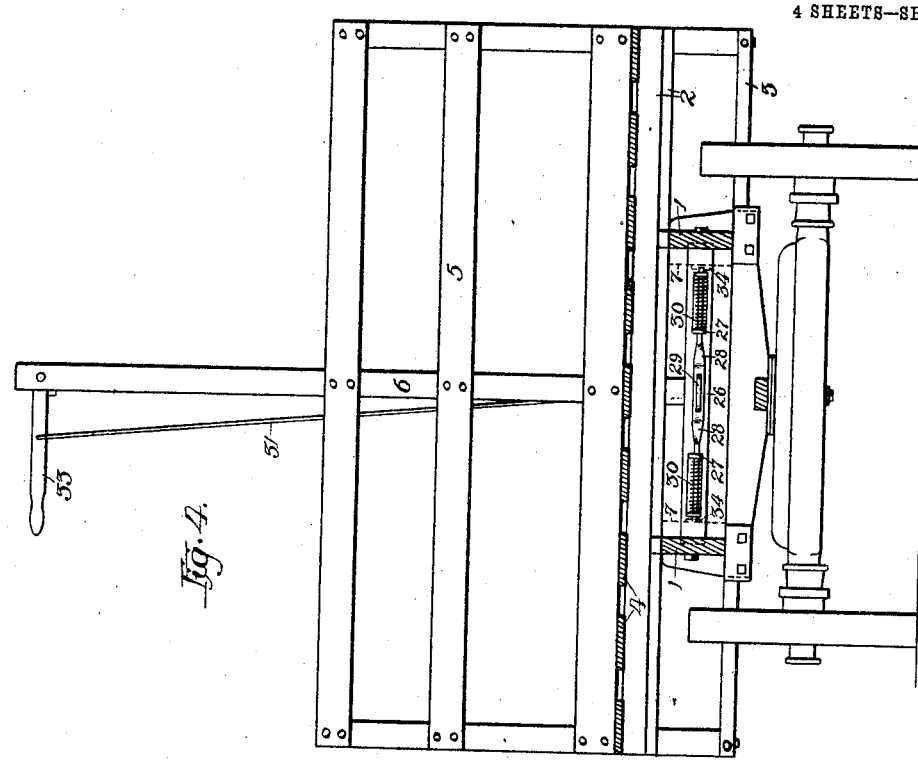
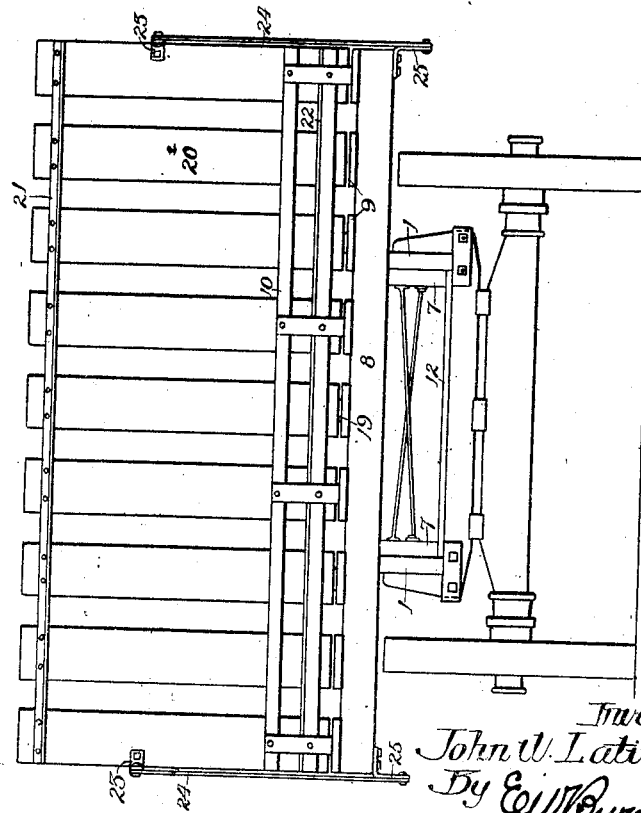
Witnesses:
Inventor:
John W. Latimer
By E. W. Burgess
Atty.

No. 829,076. PATENTED AUG. 21, 1906.
J. W. LATIMER.
HAY RACK.
APPLICATION FILED JAN. 13, 1906.
4 SHEETS—SHEET 4.
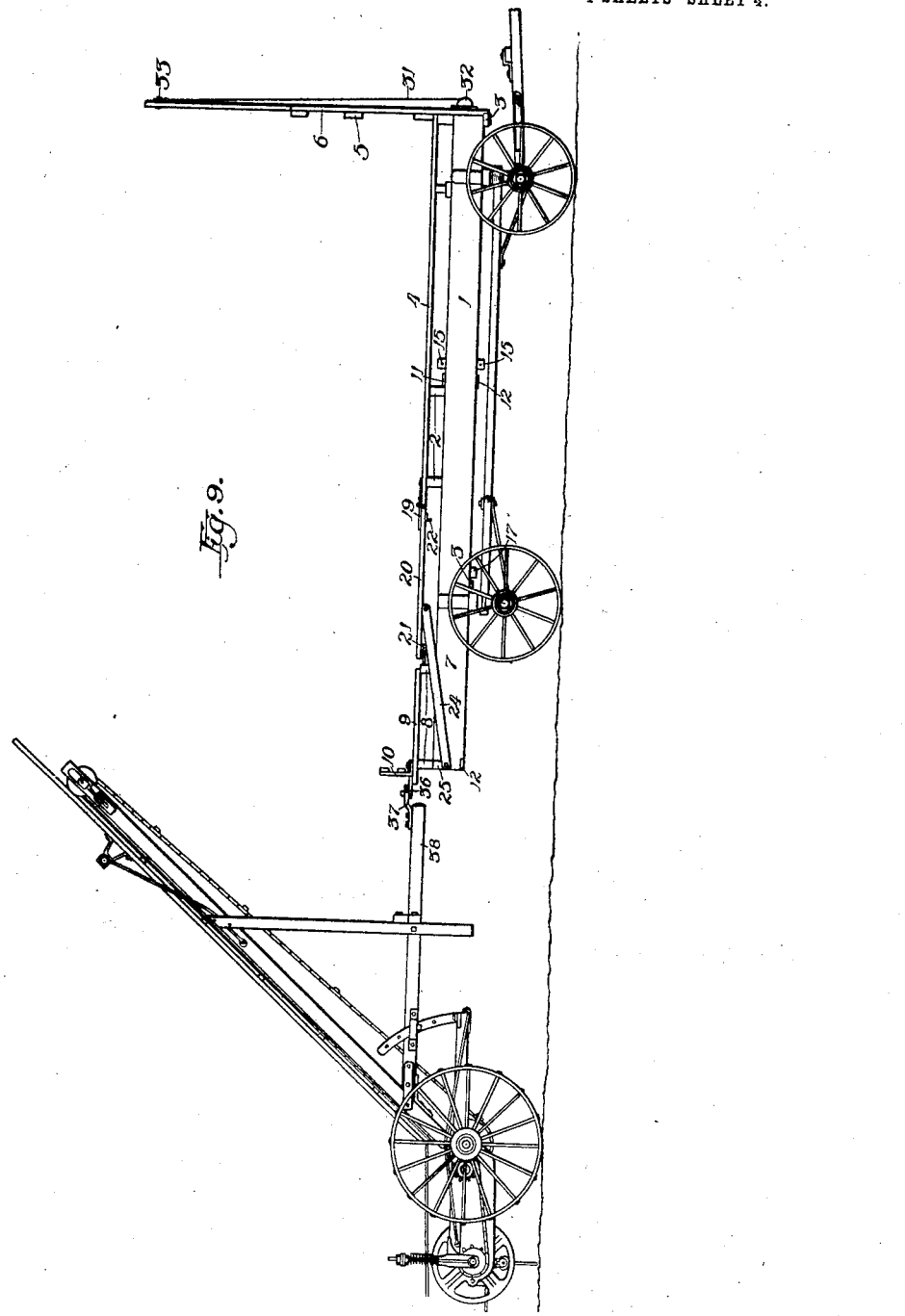
Witnesses:
Inventor
John W. Latimer
By E. W. Burgess
Atty.

UNITED STATES PATENT OFFICE.

JOHN W. LATIMER, OF CHICAGO, ILLINOIS.

HAY-RACK.

No. 829,076.            Specification of Letters Patent.            Patented Aug. 21, 1906.

Application filed January 13, 1906. Serial No. 295,861.

*To all whom it may concern:*

Be it known that I, JOHN W. LATIMER, a citizen of the United States, residing at Chicago, in the county of Cook and State of Illinois, have invented certain new and useful Improvements in Hay-Racks, of which the following is a specification, reference being had to the accompanying drawings, forming a part thereof.

My invention relates to wagon-racks, and is particularly designed for use in connection with hay-loaders which are arranged to be attached to the rear of the wagon and operate to deliver the hay upon the rear end of the rack.

It consists in a longitudinally extensible and contractile rack having means for attaching the draft attachment of a hay-loader to the rear end thereof and releaseable locking devices adapted to secure the separate members of the rack in one position of adjustment and when released allow the rack to assume a different position of adjustment, the object of the invention being to provide a mechanism that may be adjusted in a manner to permit the hay-loader to deposit the hay upon the front portion of the rack and at the will of the operator be extended rearward in position to receive the hay upon its rear portion.

Referring to the accompanying drawings, Figure 1 is a top plan view of a wagon-rack embodying my invention, the bottom boards being shown by dotted lines. Fig. 2 is a sectional side elevation of Fig. 1, representing the rack in contracted position. Fig. 3 is a rear end view of Fig. 2, showing the full width of the rack. Fig. 4 is a sectional end elevation of the front portion of the complete rack when viewed in the direction of the arrows on line A B of Fig. 2. Fig. 5 is a detached sectional detail of a part of the locking means along line C D of Fig. 2. Fig. 6 is a detail of the locking mechanism similar to that shown in Fig. 5. Fig. 7 is a sectional detail of the connecting mechanism of the frame members on line E F of Fig. 2. Fig. 8 is a similar detail on line G H of Fig. 2, and Fig. 9 is a side elevation of the rack in extended position and having a hay-loader attached thereto.

Like numerals represent the same parts throughout the several views.

Referring to the drawings, 1 indicates the fixed side sills of the rack, mounted upon the wagon-bolsters in the usual manner, and 2 represents cross-bars secured to the upper edges, and 3 similar bars secured to the lower edges thereof.

4 indicates the bottom boards of the rack secured to the cross-bars 2; 5, a vertically-arranged rack secured to the front cross-bars and having a central post 6 secured thereto and forming the usual means of attachment for the driving-reins of the draft-team.

At the inner side of each fixed sill 1 are supplemental sills 7, having cross-bars 8 secured to their rear ends, upon which are secured bottom boards 9 and a vertical transverse rack 10. The supplemental sills are connected at their front ends by means of cross-bars 11 and 12, secured to the top and bottom edges thereof, respectively, and diagonally-arranged braces 13 are connected with the sills in a manner to hold them in proper alinement with the fixed sills.

Secured to the front ends of the supplemental sills are straps 14, arranged transversely thereof and provided at their opposite ends with outwardly-projecting U-shaped loop portions 15, having rollers 16 rotatably mounted therein and adapted to engage with the top and bottom edges of the fixed sills 1, as shown in Fig. 7, and secured to the rear portions of the fixed sills are similar straps 17, having rollers 18 mounted at their lower ends and adapted to engage with the lower edges of the supplemental sills in a manner to support them, as shown in Fig. 8.

Hinge-jointed to the rear ends of the bottom boards 4 by means of common strap-hinges 19 are boards 20, that are connected together by means of the transverse bars 21 and 22, and secured to the outside boards are L-shaped brackets 23, which are pivotally connected, by means of the links 24, with similar brackets 25, secured to the lower side of the rear cross-bar, mounted on the supplemental sills 7, the mechanism being arranged in a manner to cause the links to control the movement of the boards 20 from a horizontal to a vertical position, as shown in Fig. 2. Secured to the fixed sills 1 near their front ends is a transversely-arranged bar 26, and secured to the bar near opposite ends thereof are U-shaped brackets 27, having their side members projecting rearward and provided with openings adapted to receive the outer ends of sliding lock-bars 28, that overlap each other at their inner ends and are provided with longitudinally-arranged slots adapted to receive a sliding cam 29, having inclined sides engaging with the end walls of the slotted portion of the lock-bars in a manner to cause said lock-bars to slide inward when the sliding cam is moved in one direction, and 30 represents coiled springs surrounding the lock-bars between the side members of the U-shaped brackets and operative to move said bars outward when released from the controlling-cam. The cam is slidably mounted upon the cross-bar 26 and is provided with a forwardly-projecting stem portion to which is secured one end of a flexible connection 31, that passes forward under a sheave 32 and then upward and secured to a hand-lever 33, pivotally mounted upon the post 6.

Secured to the forward ends of the supplemental sills 7 are plates 34, having outwardly-curved ends adapted to engage with the outer ends of the lock-bars in a manner to cause them to move inward when moved in one direction, and 35 represents laterally-arranged openings in the plates adapted to receive the ends of the lock-bars in a manner to lock the supplemental sills in their forward position, as shown in Fig. 5.

The rear end of the sliding portion of the rack is provided with a suitable bracket 36, adapted to engage with a draft attachment 37, secured to the draft-pole 38, forming part of a hay-loader attachment designed to deliver the hay upon the rack.

In operation the sliding portion of the rack is locked in the position shown in Fig. 2, and the hay-loader will operate to deliver the hay upon the forward portion of the rack, and when it becomes filled the operator manipulates the hand-lever 33 in a manner to release the lock-bars from engagement with the plates secured to the supplemental sills, and then by the draft of the hay-loader the sliding portion of the rack will move rearward relative to the fixed portion, as shown in Fig. 9, and allow the hay-loader to deposit the hay upon the extended portion of the rack.

What I claim as my invention, and desire to secure by Letters Patent, is—

1. A longitudinally extensible and contractile hay-rack, means for attaching a hay-loader thereto, said means coöperating with the draft of the hay-loader in a manner to extend the rack.

2. A hay-rack comprising, in combination, a relatively fixed and a longitudinally-movable section, and means for attaching a hay-loader to the movable section.

3. A hay-rack comprising, in combination, a relatively fixed and a longitudinally-movable section, releasable means for locking said movable section against movement, and means for attaching a hay-loader to said movable section.

4. A hay-rack comprising, in combination, a relatively fixed and a longitudinally-movable section, releasable means mounted upon the fixed section and operative to lock said movable section against movement, and means for attaching a hay-loader to said movable section.

5. A hay-rack comprising, in combination, a relatively fixed and a longitudinally-movable section, means mounted upon said fixed section and operative to lock said movable section against movement, said means comprising sliding locking-bars having their outer ends adapted to engage with said movable section in a manner to lock it against movement, and means engaging with their inner ends and operative to disengage them therefrom.

6. A hay-rack comprising, in combination, two sections, one of which is adapted to slide longitudinally relatively to the other, sliding lock-bars mounted upon the fixed section and having their outer ends adapted to engage with and lock the movable section against movement, a movable cam engaging with the opposite ends of said lock-bars in a manner to cause them to be disengaged from the movable section, and means for operating said cam.

7. A hay-rack comprising, in combination, two sections, one of which is adapted to slide longitudinally relatively to the other, transversely-sliding lock-bars mounted upon the fixed section and having their outer ends adapted to engage with and lock the movable section against movement, springs operative to move said lock-bars in a direction to engage with said movable section, a movable cam engaging with the inner ends of said lock-bars in a manner to move them in an opposite direction, and means for operating said cam.

8. A hay-rack comprising, in combination, two sections, one of which is adapted to slide longitudinally relatively to the other, transversely-sliding lock-bars mounted upon the fixed section and having their outer ends adapted to engage with and lock the movable section against movement, springs operative to move said lock-bars in a direction to engage with said movable section, a movable cam having oppositely-inclined surfaces engaging with the inner ends of said lock-bars in a manner to move them in an opposite direction, and means for operating said cam.

9. A hay-rack comprising, in combination, two sections, one of which is adapted to slide longitudinally relatively to the other, transversely-sliding lock-bars mounted upon the fixed section and having their outer ends adapted to engage with and lock the movable section against movement, springs operative to move said lock-bars in a direction to engage with said movable section, a sliding cam having oppositely-inclined surfaces engaging with the inner ends of said lock-bars in a manner to move them in an opposite direction, and means for operating said cam, said means comprising a flexible connection between said cam and a hand-lever pivotally mounted upon the fixed section of the rack.

10. A hay-rack comprising, in combination, a relatively fixed section having longitudinally-arranged side sills and top and bottom cross-bars secured thereto, a movable section having side sills arranged in the same horizontal plane and adapted to slide along the inner surfaces of the fixed sills, their forward ends being provided with brackets having rollers mounted thereon and adapted to move upon the top and bottom edges of the fixed sills, rollers mounted upon the fixed sills near their rear ends and operative to support the rear ends of the movable sills.

11. A hay-rack comprising, in combination, a fixed and a movable section telescopically connected, a fixed bottom forming part of the fixed section at its forward end, a movable bottom portion having its forward end pivotally connected with the rear end of the fixed bottom, and means connecting said movable portion of the bottom with said movable section of the rack whereby it is caused to turn about its pivotal connection when the movable section of the rack is moved longitudinally.

12. A hay-rack comprising, in combination, a fixed and a movable section telescopically connected, a fixed bottom forming part of the fixed section at its forward end, a movable bottom portion having its forward end pivotally connected with the rear end of the fixed bottom, and links having one end pivotally connected with said movable bottom and their opposite ends with the movable section of the rack whereby the movable section of the bottom is moved about its pivotal connection when said rack-section is moved.

13. A hay-rack comprising, in combination, a fixed and a movable section telescopically connected, a fixed bottom forming part of said fixed section at its forward end, a movable bottom portion having its forward end pivotally connected with the rear end of the fixed bottom in a manner to swing from a horizontal to a vertical position, and links having one end pivotally connected with said swinging bottom and their opposite ends with the movable section of the rack in a plane below and in rear of their pivotal connection with the swinging bottom.

In witness whereof I hereto affix my signature in presence of two witnesses.

JOHN W. LATIMER.

Witnesses:
  TINE N. DAGGETT,
  F. W. HOFFMEISTER.